United States Patent [19]

Le Roy

[11] 3,999,162
[45] Dec. 21, 1976

[54] TIME-DIVISION MULTIPLEX SWITCHING CIRCUITRY

[75] Inventor: Guy Le Roy, Lannion, France

[73] Assignees: Societe Lannionnaise d'Electronique; Compagnie Industrielle des Telecommunications Cit Alcatel, both of France

[22] Filed: Sept. 20, 1971

[21] Appl. No.: 181,953

[30] Foreign Application Priority Data

Sept. 18, 1970 France .............................. 70.33980
Feb. 11, 1971 France .............................. 71.04655

[52] U.S. Cl. .......................................... 340/172.5
[51] Int. Cl.² ........................................... G06F 3/00
[58] Field of Search ..................... 340/172.5; 445/1

[56] References Cited
UNITED STATES PATENTS

| 3,300,763 | 1/1967 | Hoehmann | 340/172.5 |
| 3,331,055 | 7/1967 | Betz et al. | 340/172.5 |
| 3,436,733 | 4/1969 | Pearce et al. | 340/172.5 |
| 3,462,743 | 8/1969 | Milewski | 340/172.5 |

Primary Examiner—Harvey E. Springborn
Attorney, Agent, or Firm—Craig & Antonelli

[57] ABSTRACT

Switching circuitry for transferring data from an input time-division multiplex system to an output time-division multiplex system includes a transfer circuit for temporarily storing the data received from the input-time-division multiplex system prior to its transfer to the output time-division multiplex system. For controlling the selective transfer of data from an input channel of the input time-division multiplex system to any one output channel of the output time-division multiplex system control circuitry is provided which controls the storage of the input channel data in a selected position of the transfer circuit with a timing corresponding to the respective time slots of the input channel and controls the transfer of that data from the selected position in the transfer circuit to the output time-division multiplex system with a timing corresponding to the respective time slot selected output channel. Write control circuitry stores in a write control memory the selected position in the transfer circuit in a word of the control memory corresponding to the time slot of the input channel in the input time-division multiplex system so that in response to time slots generated by an input time slot generator, the position address of the word in the control memory can be applied to the transfer circuit to control writing of data from the input channel into the transfer circuit in the position selected. Read control circuitry includes a read control memory wherein the selected position in the transfer circuit is stored in a word of that read control memory corresponding to the time slot of the output channel in the output time-division multiplex system so that data in the selected position of the tranfer circuit can be read out to the output time-division multiplex system at the proper time. The read and write control arrangements can also be constituted by elementary control memories connected to elementary inputs or outputs of the input and output multiplex circuitry.

2 Claims, 9 Drawing Figures

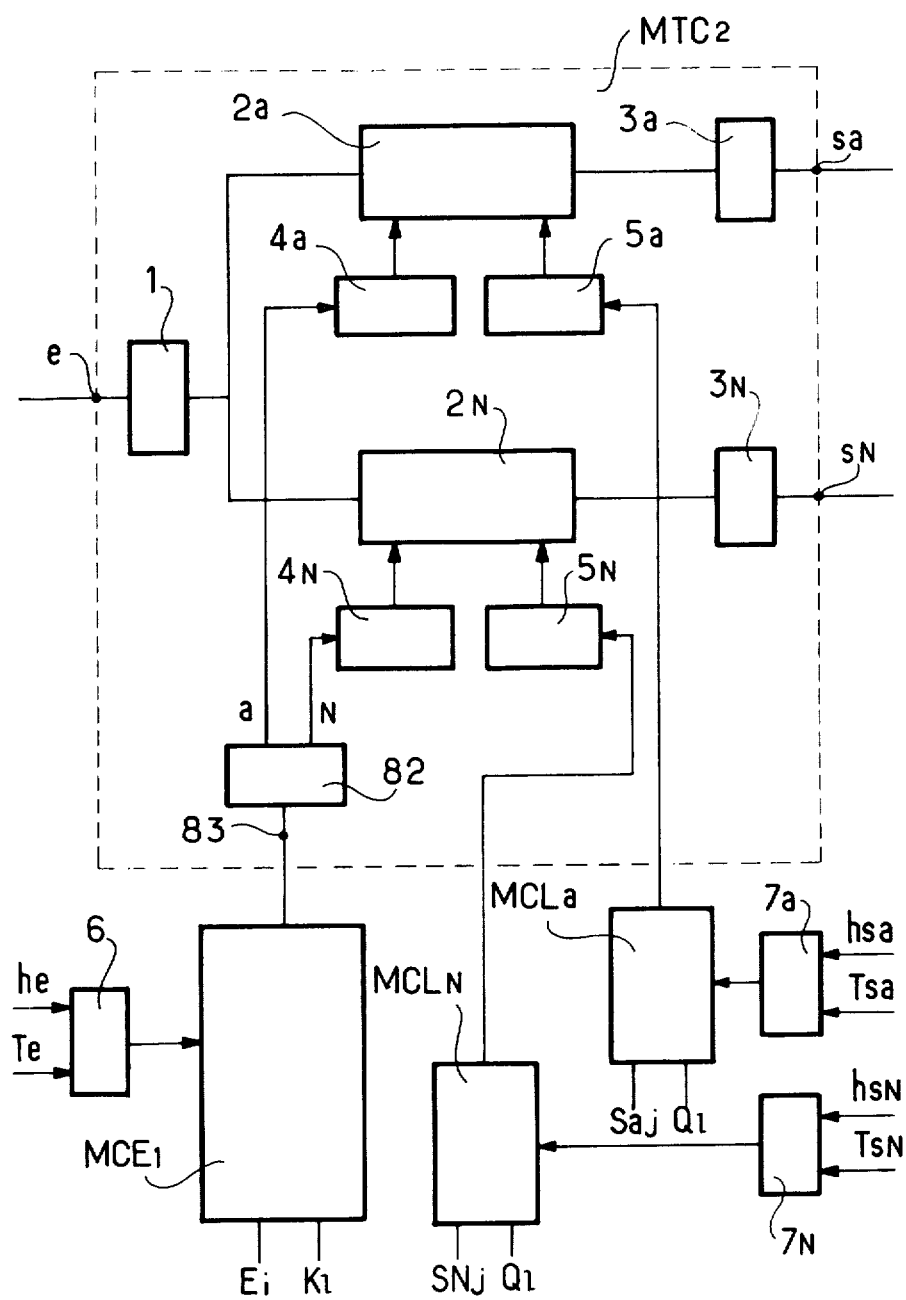

TIME-DIVISION MULTIPLEX SWITCHING CIRCUITRY

The present invention concerns switching circuitry for transferring data from an input time-division multiplex system to an output time-division multiplex system.

Such circuitry, sometimes referred to as a time switching circuit, is linked to the two time-division multiplex systems, the input multiplex system having a frame of $e$ channels and the output multiplex system having a frame of $s$ channels, and transfers data appearing on an Ei channel of the input multiplex system to an Sj channel of the output multiplex system. The transfer is carried out under the control of a memorized program recording the relationships Ei Sj between the time slot positions or rank numbers of the data in the input and output multiplex frames. The time slot positions are expressed with reference to an origin in each frame characterized by a frame locking or synchronization word. The input and output multiplex frames may operate with the same characteristic period T, but this is not necessarily always the case. The starts of the input and output frames are not necessarily in phase, and the capacities $e$ and $s$ of the input and output multiplex systems are not necessarily equal.

Generally, such switching circuitry comprises a time connection circuit or transfer circuit combined with control circuitry. The control circuitry stores either a fixed program of input-to-output connections, or a continuously changing program defined by elements external to the circuitry. On the basis of this program, the control circuitry drives the transfer circuit.

The input multiplex may comprise N elementary multiplex groups each of capacity $e$/N. These elementary multiplex groups do not necessarily have their frames in phase.

In accordance with the present invention, there is provided switching circuitry for transferring data from an input time-division multiplex system to an output time-division multiplex system, including a transfer circuit into which the incoming data is read from an input channel in a position controlled by a first time slot and from which the data is transferred to the appropriate output channel in accordance with a second time slot, the first and second time slots being provided by control circuitry connected to respective input and output channel time slot generators and in which the input-to-output channel connections are memorized and the input and output channel time slots are translated into the first and second time slots which have the form of signals in the respective time bases of the input and output multiplex groups.

The invention will now be described in more detail, by way of examples only and with reference to the accompanying diagrammatic drawings in which:

FIG. 9 is the block diagram of a system in which the output multiplex system consists of a set of elementary multiplex groups.

It will be supposed in the following description that the input and output multiplex groups are time-division multiplex systems of the pulse code modulation type.

Figure 1:
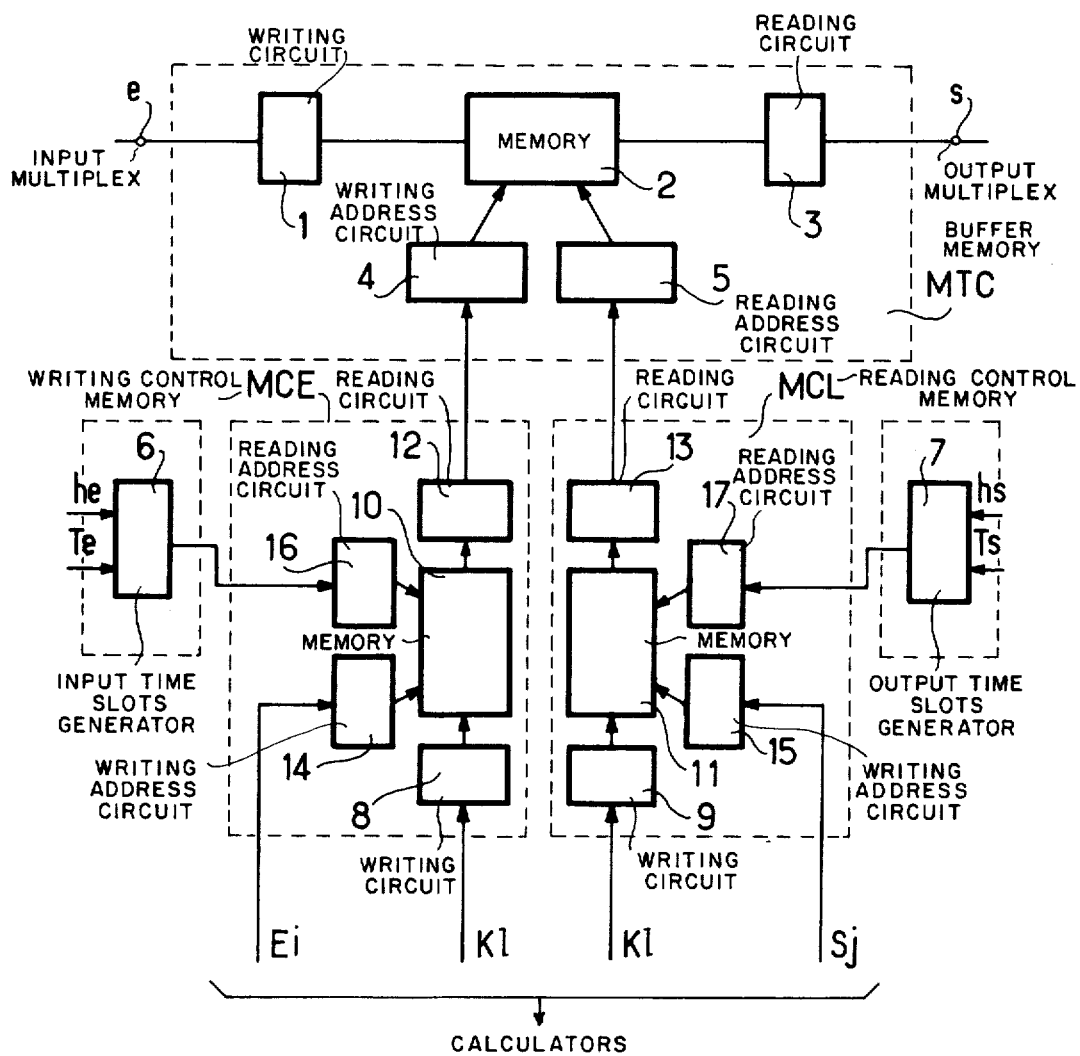
FIG. 1 is the block diagram of switching circuitry employing direct address control memories.

Referring to FIG. 1, the switching circuitry includes a buffer conversation memory or transfer memory MTC linked to respective writing and reading control memories MCE and MCL. These are linked respectively to an input time slot generator 6 and an output time slot generator 7.

The memory MTC includes a writing circuit 1 whose input is linked to an input multiplex indicated $e$, where $e$ is the number of input channels. The output of the writing circuit 1 is connected to a memory 2 whose capacity is $k$ words each of $x$ bits. The input of a reading circuit 3 is connected to the output of memory 2, and the output of the reading circuit 3 is connected to an output multiplex indicated $s$ where $s$ is the number of output channels.

The memory 2 is associated with respective writing and reading address circuits 4 and 5. Each word held in the memory 2 is accessible to the writing or reading control circuits by means of its label Kl.

The input time slot generator 6 receives signals $he$ and $Te$ from the time base of the input multiplex. At its output it provides time slot signals E consisting of the rank numbers of the channels of the input multiplex. It will be realized that these channels are temporarily separated rather than spatially.

The output time slot generator 7 receives signals $hs$ and $Ts$ from the time base of the output multiplex, and provides at its output time slot signals S consisting of the rank numbers of the output multiplex channels.

The control memory MCE includes a writing circuit 8 connected to the control elements external to the switching circuitry. Its output is connected to the input of a memory 10 with capacity of $e$ words of $\log_2 k$ memory points. The output of the memory 10 is connected through a reading circuit 12 to the writing address circuit 4 of memory MTC. A writing address circuit 14 is connected to the external control elements and to the memory 10, and a reading address circuit 16 has its input connected to the input address generator 6 and its output connected to the memory 10.

The control memory MCL includes a writing circuit 9 connected to the external control elements and to a memory 11 with a capacity of $s$ words of $\log_2 k$ memory points. The output of this memory is connected through a reading circuit 13 to the reading address circuit 5 of memory MTC. A writing address circuit 15 is connected to the external control elements and to the memory 11, and a reading address circuit 17 has its input connected to the output time slot generator 7 and its output connected to the memory 11.

The external control elements mentioned above are calculators assuring proper distribution of the connection requirements of the system in which the switching circuitry is incorporated. For this purpose the calculator stores the busy or free state of all the buffer words of the transfer memory MTC.

At each call for a connection between an input channel Ei and an output channel Sj, these calculators assign to the connection Ei Sj a buffer word Kl which is free in the transfer memory MTC. The calculators then proceed to mark the connection. This involves writing the address Kl in memory 10 through circuit 8 and under the control of circuit 14 which receives the address E*i*. At the same time, the same address K*l* is written in memory 11 through circuit 9 and under the control of circuit 15 receiving address S*j*. The address K*l* is thus stored in word E*i* of memory 10 and word S*j* of memory 11.

Once the marking operation has been carried out, the switching circuitry operates automatically. The input time slot generator 6, through reading address circuit 16, causes the word E*i* to be read cyclically in phase with the appearance of the channel E*i* of the input multiplex. This channel carries the data to be transferred to channel S*j* of the output multiplex.

The reading circuit 12 provides the address K*l* which activates the writing address circuit 4 so that the incoming data is recorded in word K*l* of the memory MTC, through the writing circuit 1.

In the same manner, the output time slot generator 7 explores memory 11 which, synchronously with the appearance of channel S*j*, delivers the address K*l* to the reading address circuit 5 to cause the word K*l* of memory 2 to be read and passed through reading circuit 3 to the output channel S*j*.

When the connection is to be broken, the control elements erase the addresses previously inscribed in memories MCE and MCL by writing in zeros according to the process just described for memorizing the addresses. Once the address K*l* is no longer held in memories MCE and MCL, the connection E*i* S*j* is broken.

Memories 2, 10, and 11 may be of the addressable type, with one or two addressing circuits, and either static or dynamic. The memories 10 and 11 may equally be circulating memories, respectively activated by the time bases of the input and output multiplexes. In this case the time slot generators 6 and 7 serve for the temporal selection in the writing of words E*i* and S*j* of these memories. Various types of circulating memories are available in the trade.

Figure 2:
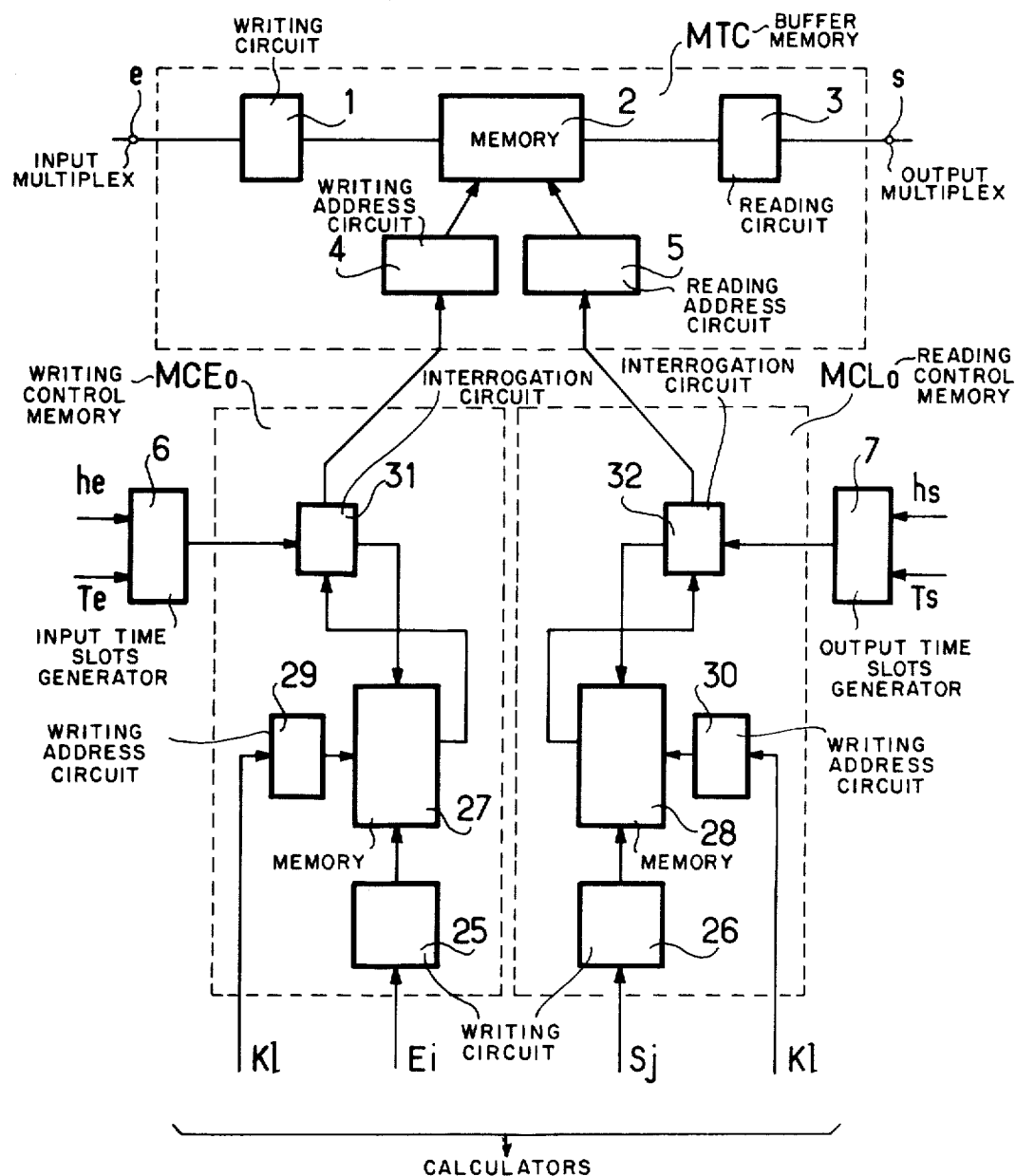
FIG. 2 is the block diagram of switching circuitry employing indirect address control memories.

FIG. 2 shows switching circuitry in which the control memories are of the indirect addressing type. The memory MTC and input and output time slot generators 6 and 7 are identical to those just described with reference to FIG. 1; however, the reading and writing control memories MCE*o* and MCL*o* differ from those described in FIG. 1.

The indirect address writing control memory MCE*o* comprises a writing circuit 25 and a writing address circuit 29 connected to the external control elements already mentioned in the description of FIG. 1. Their outputs are connected to a memory 27 with capacity of *k* words of $\log_2 e$ memory points. An interrogation circuit 31 has two inputs connected respectively to the input time slot generator 6 and the output of the memory 27. One output of the interrogation circuit 31 is connected to an input of memory 27. A further output is connected to the writing address circuit 4 of memory MTC.

The indirect address reading control memory MCl*o* includes a writing circuit 26 and a writing address circuit 30 connected to the previously mentioned external control elements. A memory 28 has a capacity of *k* words of $\log_2 s$ memory points and its output is connected to one input of an interrogation circuit 32 whose second input is connected to the output time slot generator 7. A first output of the circuit 32 is connected to an input of memory 28 and a second output to the writing address circuit 5 of memory MTC.

It should be emphasized here that the three memories MTC, MCE*o* and MCO*o* have the same capacity of *k* words.

On each request for a connection between an input channel E*i* and an output channel S*j*, a free buffer word K*l* is assigned to the connection E*i* S*j* and the connection is marked by, firstly, writing the address E*i* in the memory 27, where it is memorized in word K*l*, and, secondly, writing the address S*j* in memory 28, where it is memorized in word K*l*.

Once the marking operation has been carried out, the switching circuitry operates automatically. The input time slot generator 6 applies to the interrogation circuit 31 time slot signals E, in cyclic fashion and in phase with the appearance of the channels E of the input multiplex. At the appearance of time slot E*i* the interrogation circuit 31 searches memory 27 for the address E*i* held in word K*l*. This address K*l* appears at the output of circuit 31 and, by means of addressing circuit 4, causes the incoming data in channel E*i* to be memorized in word K*l* of memory 2. This is carried out through the writing circuit 1.

In the same fashion, the output time slot generator 7 explores the interrogation circuit 32 which provides at its output at the passage of time slot S*j* the address K*l*. This, through the addressing circuit 5, causes the word K*l* of memory 2 to be read and passed through writing circuit 3 to the output multiplex. This occurs in phase with the passage of the corresponding channel S*j*.

When a connection is to be broken, the contents of memories 27 and 28 are erased in the manner just described with reference to FIG. 1.

The buffer memory 2 may be of the addressable type with one or two addressing circuits, and either static or dynamic. The various memories and associated circuits of FIGS. 1 and 2 may be of various forms, but are preferably integrated circuits in the TTL technology.

Figure 3:
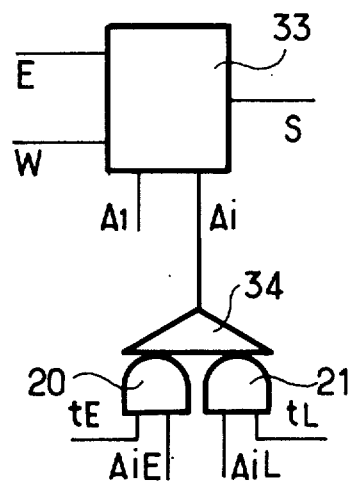
FIGS. 3 to 7 are schematic diagrams of various forms of transfer and control memory circuits which may be utilized in the systems of FIGS. 1 and 2.

FIG. 3 shows an addressable memory with a single addressing circuit. The memory 33 has two inputs, one receiving signals E making up the data to be memorized and the other receiving writing signals W. The memory has a single output S. The memory has *i* addressing inputs A1, A2 . . . A*i* each connected to an access circuit such as that shown in FIG. 3 and comprising an OR-gate 34 having its output connected to the corresponding addressing input and two inputs each connected to the output of one of a pair of AND-gates 20 and 21. One input of AND-gate 20 receives a signal *t*E from the time base of the input multiplex, while the other receives a writing address A*i*E.

One input of gate 21 receives a signal *t*S from the time base of the output multiplex, *t*S and *t*E not coinciding, and the other input receiving a reading address A*i*L. The gate 20 is sampled by the clock signal *he* and receives the writing instructions A*i*E, but only transfers the latter to the input A*i* through gate 34 when signals *he* and A*i*E coincide. Similarly, the reading signal A*i*L is only transferred to input A*i* when this appears simultaneously with the signal *hs*.

The memory 33 may be an integrated memory with 16 word cells of 1 or 4 bits. These are widely used in data handling applications. Also widely used in such fields are integrated circuits comprising several OR-gates whose inputs are controlled by two or more AND-gates, and by means of which each of the access circuits such as just described may be formed.

Figure 4:
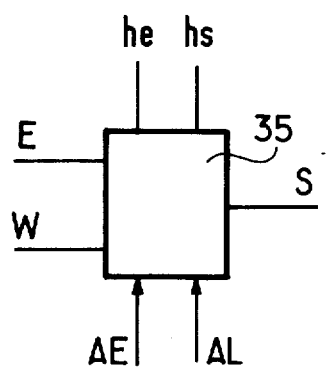

FIG. 4 shows an addressable memory 35 having two address circuits. Two inputs receive the signals E and W, as in FIG. 3, and the memory has a single output S. Two inputs receive the clock signals he and hs, and each of two address inputs AE and AL includes a predetermined number of individual inputs. Such a memory can be constructed with integrated circuits. Currently available in the trade are memories for four words each of 4 bits, suitable for this application.

Figure 5:
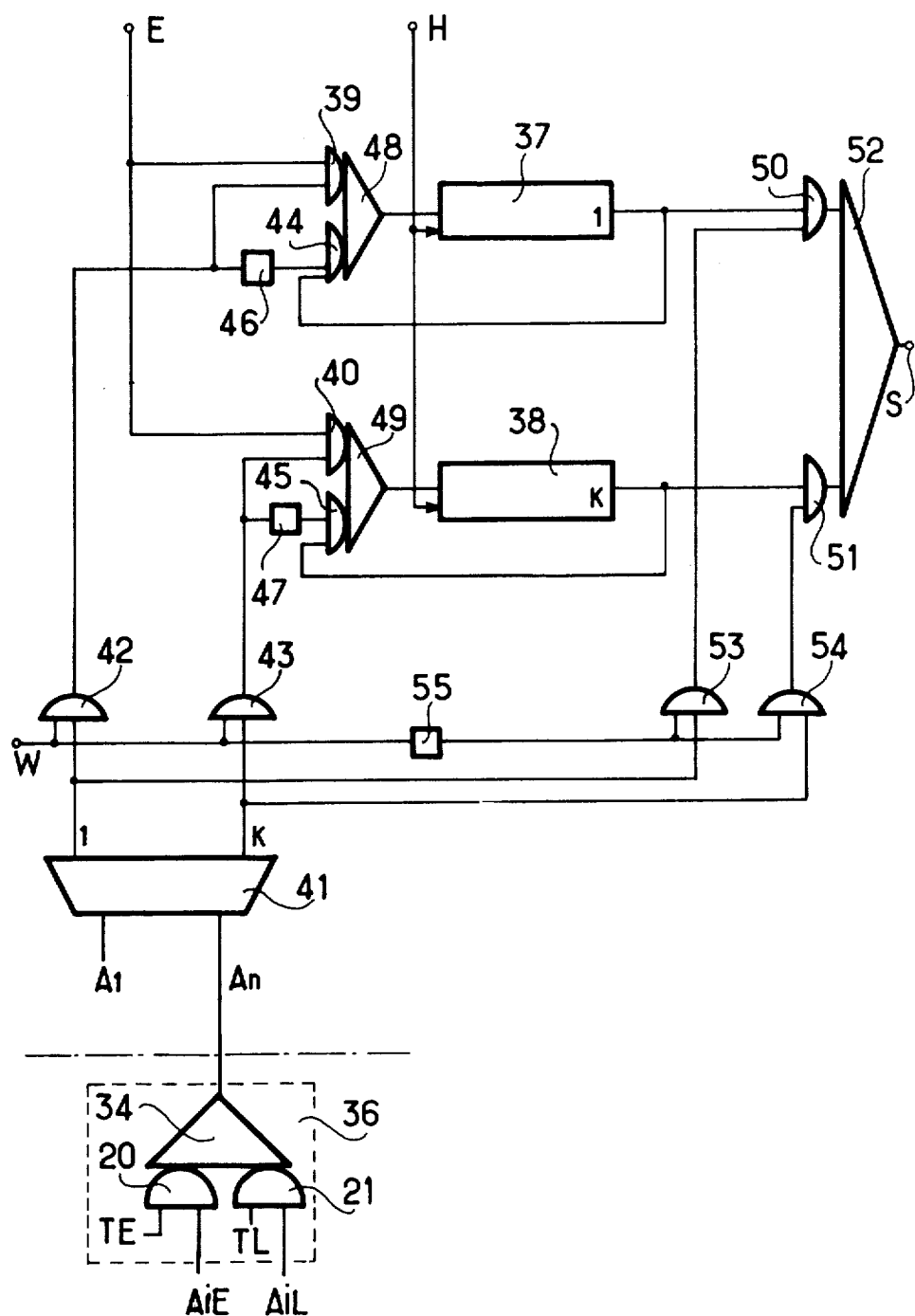
Figure 6:
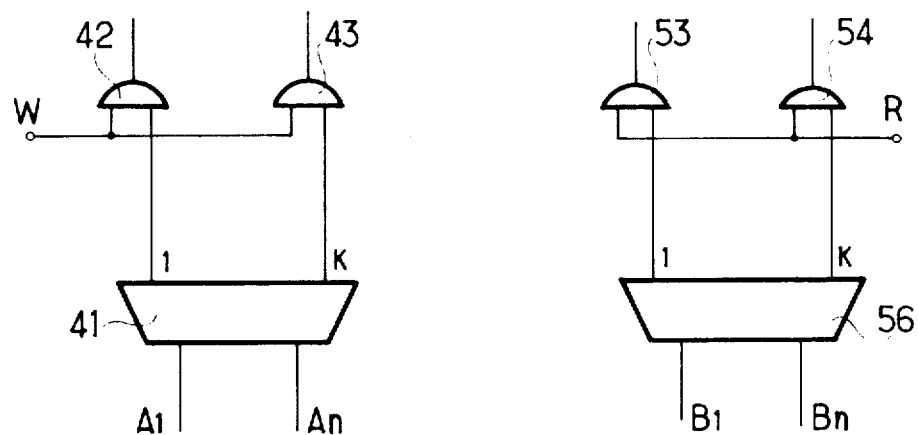

The memories described with reference to FIGS. 3 and 4 are static memories. FIGS. 5 and 6 show dynamic memories, that is to say memories in which each data word is held in a shift register looped upon itself, the words being held in series and circulating serially during their storage times.

The addressing circuit of the memory of FIG. 5 consists of $k$ shift registers each with $x$ divisions. Only the first and last register are shown in FIG. 5. They are referenced 37 and 38. The outputs of registers 37 and 38 are linked to first inputs of respective AND-gates 50 and 51. The outputs of these gates are linked to inputs of an OR-gate 52 whose output constitutes the memory output S. It will be appreciated that each of the remaining shift registers is similarly connected to the OR-gate 52 through an AND-gate.

Each register receives clock pulses over a connection labeled H, and the input of register 37 is connected to the output of an OR-gate 48 whose two inputs are connected to the outputs of respective AND-gates 39 and 44. The input of register 38 is connected to the output of an OR-gate 49 whose two inputs are connected to the outputs of respective AND-gates 40 and 45.

A first input of each of gates 39 and 40 is connected to a terminal E at which appear the data to be memorized. Second inputs of gates 30 and 40 are respectively connected to the outputs of AND-gates 42 and 43, being two of a set of $k$ gates each having a first input connected to a respective output of an address decoder 41. A second input of each of these $k$ gates is connected to a terminal W to receive a writing instruction.

One input of gate 44 is connected to receive the output of register 37, and one input of gate 45 is connected to receive that of register 38. The other input of gate 45 is connected to the output of gate 43 through an inverter 47. The other output of gate 44 is connected to the output of gate 42 through an inverter 46.

The $k$ outputs of decoder 41 are each connected to a first input of a respective AND-gate of which two are shown at 53 and 54. A second input of each of these gates is connected to terminal W through an inverter 55. Each of $n$ inputs A$l$ to A$n$ of the decoder 41 is connected to a respective access circuit, one of which is shown at 36, identical to the access circuits of memory 33 as shown in FIG. 3.

In the absence of a writing address signal on gates 39 and 40, the registers 37 and 38 are looped upon themselves through gates 44 and 45, and the data held in the registers circulates under the control of the clock pulses from connection H.

To write a word into a register involves activating the decoder 41 by its address wires and simultaneously providing the writing order W. The latter opens one of the gates 39,40 while the looping gate 44 or 45 corresponding thereto is cut off by the respective inverter 46 or 47.

The data present on terminal E is directed through one of the gates 39 or 40 and the corresponding gates 48 or 49 to the input of the corresponding register 37 or 38. There it is recorded at the rate set by the clock pulses.

When the writing order W disappears, the register in which the word is recorded is looped upon itself again, and the data circulates at the clock pulse rate.

When the writing order W is present, gates 53 and 54 are cut off by this signal, by means of the inverter 55. In the absence of the order W the gates 53 and 54 are open, and an address signal applied to decoder 41 opens one or other of gates 50 or 51 through the corresponding gates 53 or 54. The content of the corresponding register 37 or 38 is transmitted to output S under the control of the clock pulses. It will be seen that this form of read-out is non-destructive.

The memory of FIG. 5 has a single addressing circuit. It may be modified by the provision of two addressing circuits, one for writing and one for reading. FIG. 6 shows how the circuitry of FIG. 5 must be modified to this effect.

Referring to FIG. 6, the connections to gates 42 and 43 are unchanged, but gates 53 and 54 have first inputs connected to respective outputs of a reading address decoder 56 and second outputs connected to a terminal R to receive a read instruction. It will be appreciated that the decoder 56 has $k$ outputs, each connected to a respective AND-gate, gates 53 and 54 being two of these $k$ gates. The decoder 56 has $n$ inputs B$l$ to B$n$.

Figure 7:
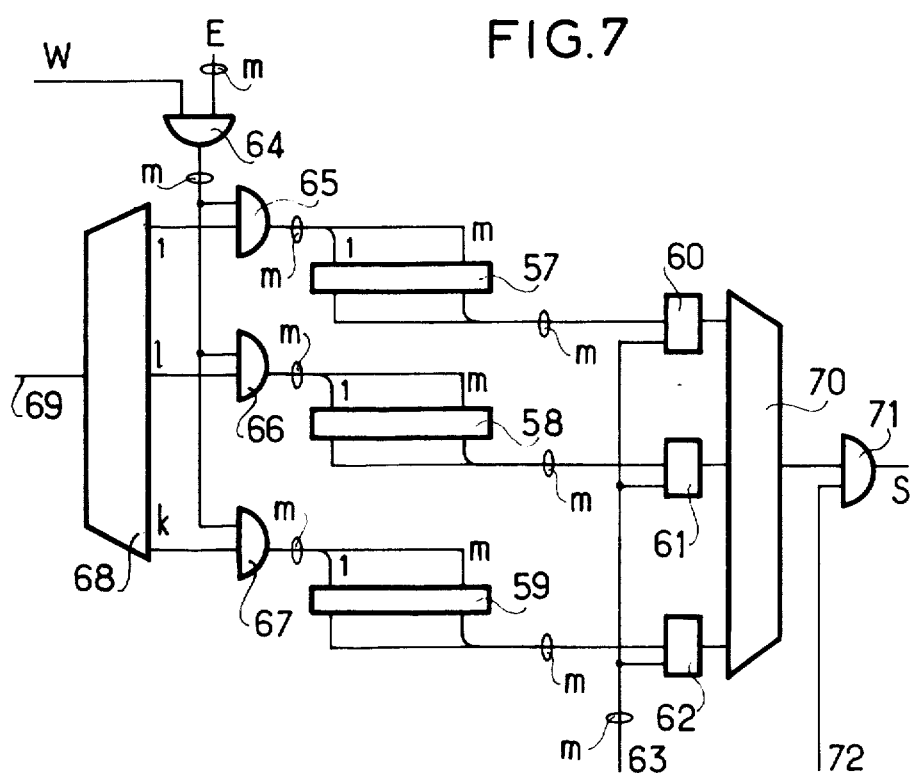

FIG. 7 shows an indirect address memory comprising $k$ shift registers associated with $k$ comparators, three registers being indicated 57, 58, and 59, and three comparators 60, 61, and 62. Each comparator has two sets of inputs. The inputs of a first set are connected to corresponding divisions of the associated register. The inputs of the second set are connected to corresponding branches of an interrogation circuit 63 common to all $k$ comparators.

The outputs of the comparators are connected to respective inputs of a coder 70 whose output is connected to one input of an AND-gate 71, the output of which is the output S. On its second input the gate 71 receives an interrogation instruction 72.

The register inputs are connected to respective AND-gates, those for registers 57, 58, and 59 being indicated 65, 66, and 67, respectively. These gates are shown schematically in FIG. 7, as in fact each is composed of $m$ separate AND-gates each connected to one division of the corresponding register. Each of gates 65, 66, and 67 has one input connected to the output of an AND-gate 64. The AND-gate 64 is also in practice composed of m separate AND-gates. On one input gate 64 receives a writing order W and on a second input the signal E. This signal E is provided over $m$ wires, one for each bit.

Gates 65, 66, and 67 have their second inputs connected to respective outputs of a decoder 68 which receives the addresses on an input 69.

Writing into the registers is carried out as follows: When the writing order W is present, the data on input E appears at each of the $k$ gates represented by gates 65 to 67. One of these gates is opened by the energized output of the decoder 68, corresponding to the address applied to input 69. If the energized output is that connected to gate 66, the data E is recorded in register 58.

When a reading address is present at input 63, it is applied to each of the $k$ comparators represented by comparators 60, 61, and 62. If the signal applied to input 63 is identical to that held in register 58, comparator 61 responds so that the coder 70 provides at its output the address of register 58. This appears at output S when an interrogation instruction on input 72 corresponds with the presence of the signal on input 63.

Figure 8:
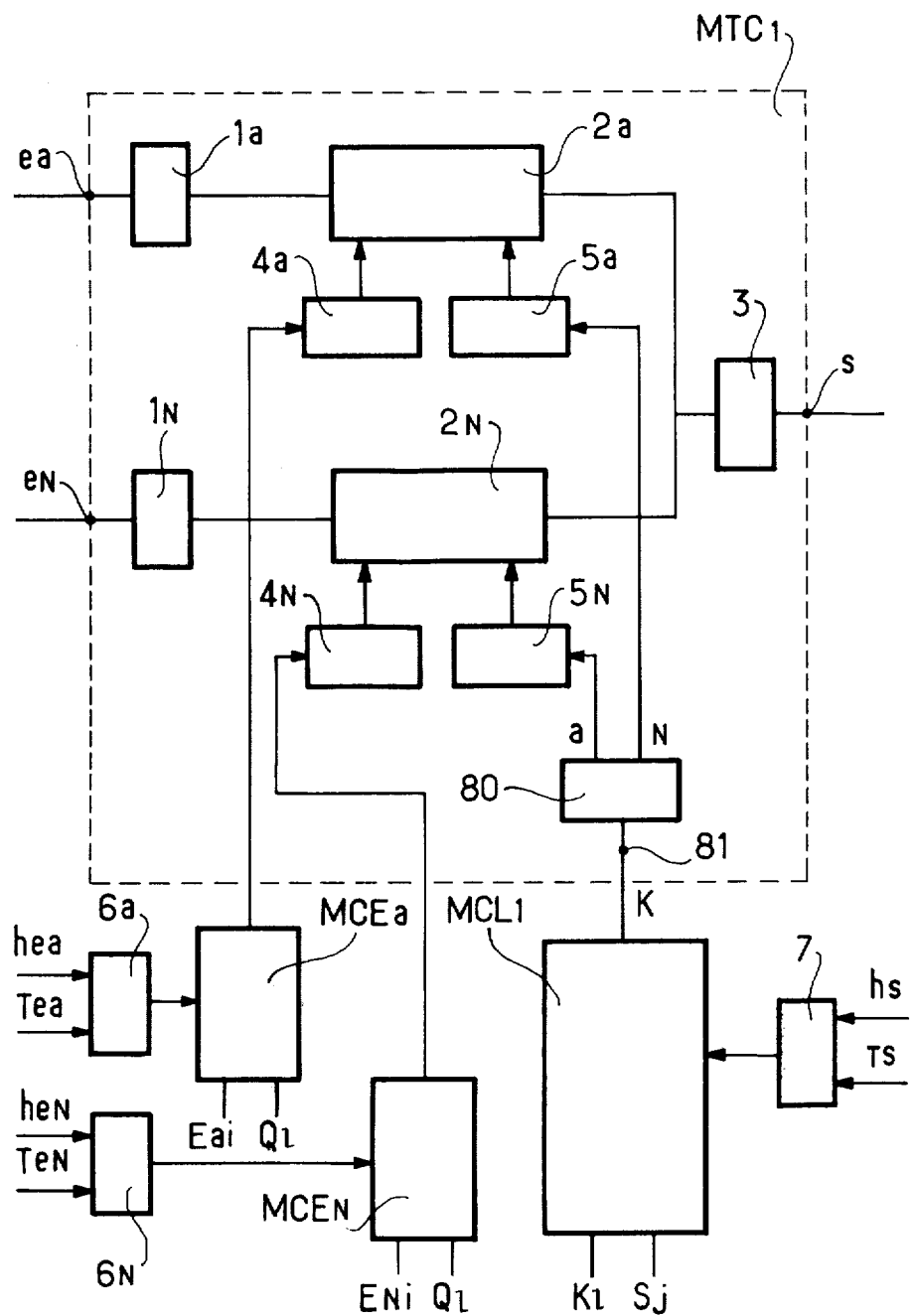
FIG. 8 is the block diagram of a system in which the input multiplex system consists of a set of elementary multiplex groups.

The switching circuitry of FIG. 8 interconnects N elementary input multiplexes *ea* to *eN* and an output multiplex *s*. It comprises a transfer memory MTCl, a reading control memory MCL1, and N writing control memories MCE*a* to MCE*n*. The writing control memories are connected to respective input time slot generators 6*a* to 6N and the reading control memory to an output time slot generator 7.

For convenience, it will be supposed that the N input multiplexes are identical, although this is not obligatory. They are connected to respective writing circuits 1*a* to 1N whose outputs are connected to respective memories 2*a* to 2N each with a capacity of Q words each of *x* bits. Writing address circuits 4*a* to 4N are respectively associated with the memories 2*a* to 2N, as are reading address circuits 5*a* to 5N.

A distribution circuit 80 has N outputs labeled *a* to N and a single input 81. Each output is connected to a corresponding one of the reading control circuits 5*a* to 5N. The outputs of the N memories 2*a* to 2N are connected through a writing circuit 3 to the output multiplex *s*.

Each time slot generator 6*a* to 6N provides time slot signals E*a* to EN under the control of clock signals *hea* to *heN* and synchronization signals T*ea* to T*eN*. These time base and synchronization signals are associated with the respective input multiplexes. The time slot generator 7 provides time slot signals S under the control of time base signals *hs* and synchronization signal TS, both associated with the output multiplex.

Each of the control memories MCE*a* to MCEN may be either as described with reference to FIG. 1 or with reference to FIG. 2. Thus, for example, the control memories MCE*a* to MCEN will respectively hold *ea* to *eN* words each of *q* memory points. Each memory receives from external elements the respective address EA*i* to EN*i* of an incoming channel of the respective elementary multiplex, and the address Q1 of the free buffer word in the corresponding memory 2*a* to 2N. The circuit operation is identical to that described with reference to FIG. 1 or FIG. 2.

The control memory MCL*l* and its time slot generator 7 may be either as described with reference to FIG. 1 or with reference to FIG. 2. The memory MCL*l* provides at its output the time slot signals K, these being applied to the distribution circuit 80. The number of time slots K is equal to the sum of the number of time slot Q of the writing control memories. These time slot signals are directed by the distribution circuit 80 to the various reading address circuits 5*a* to 5N. The operation of the reading control memory MCL*l* is identical to that described with reference to FIG. 1 or FIG. 2.

The circuitry of FIG. 9 interconnects a single input multiplex *e* to N elementary output multiplexes *sa* to *sN*. It includes a buffer memory MTC2, a writing control memory MCE*l*, and N reading control memories MCL*a* to MCLN. There is a single input time slot generator 6 and N output time slot generators 7*a* to 7N.

For convenience it will be supposed that the elementary output multiplexes are identical, although this is not necessarily so.

The memory MTC2 includes a writing circuit 1 connected to N memories 2*a* to 2N, the output of each of which is connected to the respective output multiplex through a respective writing circuit 3*a* to 3N. The capacity of each memory 2*a* to 2N is Q words each of *x* bits.

N writing address circuits 4*a* to 4N are associated with memories 2*a* to 2N respectively, as are N reading address circuits 5*a* to 5N. A distribution circuit 82 has N outputs labeled *a* to N, each linked through a respective writing address circuit 4*a* to 4N to a respective memory 2*a* to 2N.

Time slot generator 6 receives time base signals *he* and synchronization signals T*e* of the input multiplex, and provides at its output time slot signals E. Time slot generators 7*a* to 7N provide at their outputs respective time slot signals S*a* to SN, each receiving time base signals *hsa* to *hsN* respectively and synchronization signals T*sa* to T*sN* respectively, from the respective output multiplexes.

The memory MCE*l* and its time slot generator 6 may be either as described with reference to FIG. 1 or with reference to FIG. 2. The memory provides at its output the time slot signals K whose number is equal to the sum of the numbers of the time slot Q of the reading control memories. These time slot signals are directed by the distribution circuit 82 to the various writing address circuits 4*a* to 4N. The operation of the memory MCE*l* is identical to that described with reference to FIG. 1 or FIG. 2.

Each of the control memories MCL*a* to MCLN may be either as described with reference to FIG. 1 or with reference to FIG. 2. Thus, for example, each control memory MCL*a* to MCLN holds *ea* to *eN* words respectively, each of *q* memory points. Each memory receives from external elements the respective addresses E*ea* to EN*i* of an associated channel of the corresponding output multiplex, to which data appearing on the input multiplex is to be transferred. Each memory also receives the address Q*l* of the free buffer word in the corresponding memory 2*a* to 2N. The operation is identical to that described with reference to FIG. 1 or FIG. 2.

It will be apparent that various forms of the switching circuitry may be constructed. The following expressions define for the various types of circuitry the number A of memory points required in the buffer memory, that is, A binary elements for a buffer memory constructed in accordance with currently used binary code systems. They also give the number B of control memory points, the numbers A and B being based on the channel capacity *e* of the input multiplex, the channel capacity *s* of the output multiplex, the maximal number *k* of connections simultaneously available between the input and output multiplexes, and the number *x* of data bits carried by each channel.

With two direct address control memories:
$A_l = xk$ and $B_l = (e + s) \log_2 k$
With one direct address writing control memory:
$A_2 = xs$ and $B_2 = e \log_2 s$
With a single direct address reading control memory:
$A_3 = xe$ and $B_3 = l \log_2 e$
With two indirect address control memories:
$A'_l = xk$ and $B'_l = k \log_2 e.s$.
With one indirect address writing control memory:
$A'_2 = xs$ and $B'_2 = s \log_2 e$
With one indirect address reading control memory:
$A_{83} = x_2$ and $B'_3 = e \log_2 s$ From the above expressions, it will be seen that circuitry using two control memories are of interest in that the number *k* of connections is significantly less than the number of input and output channels *e* and *s*. This is particularly so for the indirect address memories with which it is possible to only provide the useful number of memory words *k* in each memory.

Where direct address control memories are used, switching circuitry with two memories is of particular interest with fixed connection programs. In this case the control memories may be passive memories, and these may be integrated with high density, so that the volume of the equipment can be considerably reduced.

As is well known, if the input multiplex has the smaller capacity, or if the capacities of the two multiplexes are equal, it is always possible to assign a label $S_j$ to a label $E_i$, and such switching circuitry is reputed unblockable. Such switching circuitry in which the number of input and output lines is the same is sometimes described as "square."

One application of such switching circuitry is in the switching networks of telephone links. In such applications, the input and output multiplexes have the same capacity and the same frame T of 125 microseconds, comprising for example 32 time channels. Each multiplex preferably includes 32 lines, so that the buffer memory and control memories each comprise 1,024 words.

What is claimed is:

1. Switching circuitry for transferring data from a specified input channel occupying a selected one of a plurality of time slots of an input time-division multiplex system to a specified output channel occupying a selected one of a plurality of time slots of an output time-division multiplex system comprising transfer memory means including a plurality of buffer memories each connected to receive a respective input time-division multiplex system and having a plurality of memory positions and being responsive to a position signal for writing incoming data from an input channel of an input time-division multiplex system into a selected buffer memory in a selected memory position thereof designated by said position signal and for transferring the data from said selected memory position to an output channel of a single output time-division multiplex system; input time slot generator means including a plurality of input time slot generators and output time slot generator means including a single output time slot generator for generating respective sets of time slot signals corresponding to the time slots of the input and output time-division multiplex systems, respectively; control circuit means including a write control circuit connected to said input time slot generator means and a read control circuit connected to said output time slot generator means and responsive to a position signal and a pair of signals designating the specified input and output channels for applying said position signal to said transfer memory means to write data from said input multiplex system into a memory position designated by said position signal to said output multiplex system in coincidence with generation of the time slot signal corresponding to said specified output channel, said write control circuit including a plurality of write memories each connected to a respective buffer memory for storing the address of said selected memory position in the associated buffer memory of said transfer memory means in a time slot occupied by said specified input channel of an input multiplex system and said read control circuit including a single read memory for storing the address of said selected memory position in said transfer memory means in a time slot occupied by said specified output channel in an output multiplex system; and distribution means for sequentially connecting said single read memory to said transfer memory means in control of said plural buffer memories.

2. Switching circuitry for transferring data from a specified input channel occupying a selected one of a plurality of time slots of an input time-division multiplex system to a specified output channel occupying a selected one of a plurality of time slots of an output time-division multiplex system comprising transfer memory means including a plurality of buffer memories each connected to a respective output time-division multiplex system and having a plurality of memory positions and being responsive to a position signal for writing incoming data from an input channel of a single input time-division multiplex system into a selected buffer memory in a selected memory position thereof designated by said position signal and for transferring the data from said selected memory position to an output channel of an output time-division multiplex system; input time slot generator means including a single input time slot generator and output time slot generator means including a plurality of output time slot generators for generating respective sets of time slot signals corresponding to the time slots of the input and output time-division multiplex systems, respectively; control circuit means including a write control circuit connected to said input time slot generator means and a read control circuit connected to said output time slot generator means and responsive to a position signal and a pair of signals designating the specified input and output channels for applying said position signal to said transfer memory means to write data from said input multiplex system into a memory position designated by said position signal in coincidence with generation of the time slot signal corresponding to said specified input channel and to transfer data from said memory position designated by said position signal to said output multiplex system in coincidence with generation of the time slot signal corresponding to said specified output channel, said write control circuit including a write memory for storing the address of said selected memory position in said transfer memory means in a time slot occupied by said specified input channel of an input multiplex system and said read control circuit including a plurality of read memories each connected to a respective buffer memory for storing the address of said selected memory position in the associated buffer memory of said transfer memory means in a time slot occupied by said specified output channel in an output multiplex system; and distribution means for sequentially connecting said single write memory to said transfer memory means in control of said plural buffer memories.

* * * * *